US008463616B2

(12) United States Patent
Fox et al.

(10) Patent No.: US 8,463,616 B2
(45) Date of Patent: Jun. 11, 2013

(54) SCHEDULING A PROCESS ACCORDING TO TIME-VARYING INPUT PRICES

(75) Inventors: Brenton A. Fox, Moscow, ID (US); William C. Strand, Moscow, ID (US)

(73) Assignee: Invensys Systems, Inc., Foxboro, MA (US)

(*) Notice: Subject to any disclaimer, the term of this patent is extended or adjusted under 35 U.S.C. 154(b) by 2884 days.

(21) Appl. No.: 10/271,365

(22) Filed: Oct. 15, 2002

(65) Prior Publication Data

US 2004/0073438 A1 Apr. 15, 2004

(51) Int. Cl.
*G06Q 10/00* (2012.01)
*G01R 21/133* (2006.01)

(52) U.S. Cl.
USPC ............................................ 705/1.1; 705/412

(58) Field of Classification Search
USPC ................ 705/1, 1.1, 80, 300–348, 901–912, 705/412
See application file for complete search history.

(56) References Cited

U.S. PATENT DOCUMENTS

| 3,408,503 | A | * | 10/1968 | Wyman et al. ................. 307/38 |
| 5,274,571 | A |   | 12/1993 | Hesse et al. |
| 5,315,521 | A | * | 5/1994  | Hanson et al. ................ 700/103 |
| 5,331,546 | A | * | 7/1994  | Webber et al. .................... 705/6 |
| 5,369,570 | A |   | 11/1994 | Parad |
| 5,974,403 | A | * | 10/1999 | Takriti et al. .................. 705/412 |
| 6,178,362 | B1 | * | 1/2001 | Woolard et al. ............... 700/295 |
| 6,468,210 | B1 | * | 10/2002 | Iliff ............................... 600/300 |
| 2002/0018545 | A1 | * | 2/2002 | Crichlow ................. 379/106.03 |
| 2002/0026336 | A1 | * | 2/2002 | Eizenburg et al. ................ 705/5 |
| 2002/0091653 | A1 | * | 7/2002 | Peevey .......................... 705/412 |

FOREIGN PATENT DOCUMENTS

| EP | 0999418 A2 | * | 1/1999 |
| EP | 0 999 418 A2 |   | 5/2000 |

* cited by examiner

*Primary Examiner* — Dennis Ruhl
*Assistant Examiner* — Paul R Fisher
(74) *Attorney, Agent, or Firm* — Edward S. Jarmolowicz

(57) ABSTRACT

Disclosed are methods for scheduling when to run a process to take advantage of time-varying input prices by predicting the "rank" of the current actual input price among future input prices. The rank is that portion of a future time period during which the input price will be less than the current actual input price. An "operational cutoff" is set based on the portion of time during which a process should run in order to produce a target output amount. Periodically, the actual input price is determined, and its rank is predicted. The predicted rank is then compared with the operational cutoff. If the predicted rank is below the cutoff, then it makes economic sense to run the process. Otherwise, it would be cheaper not to run the process at present but to wait a while in expectation that the input price will drop.

26 Claims, 11 Drawing Sheets

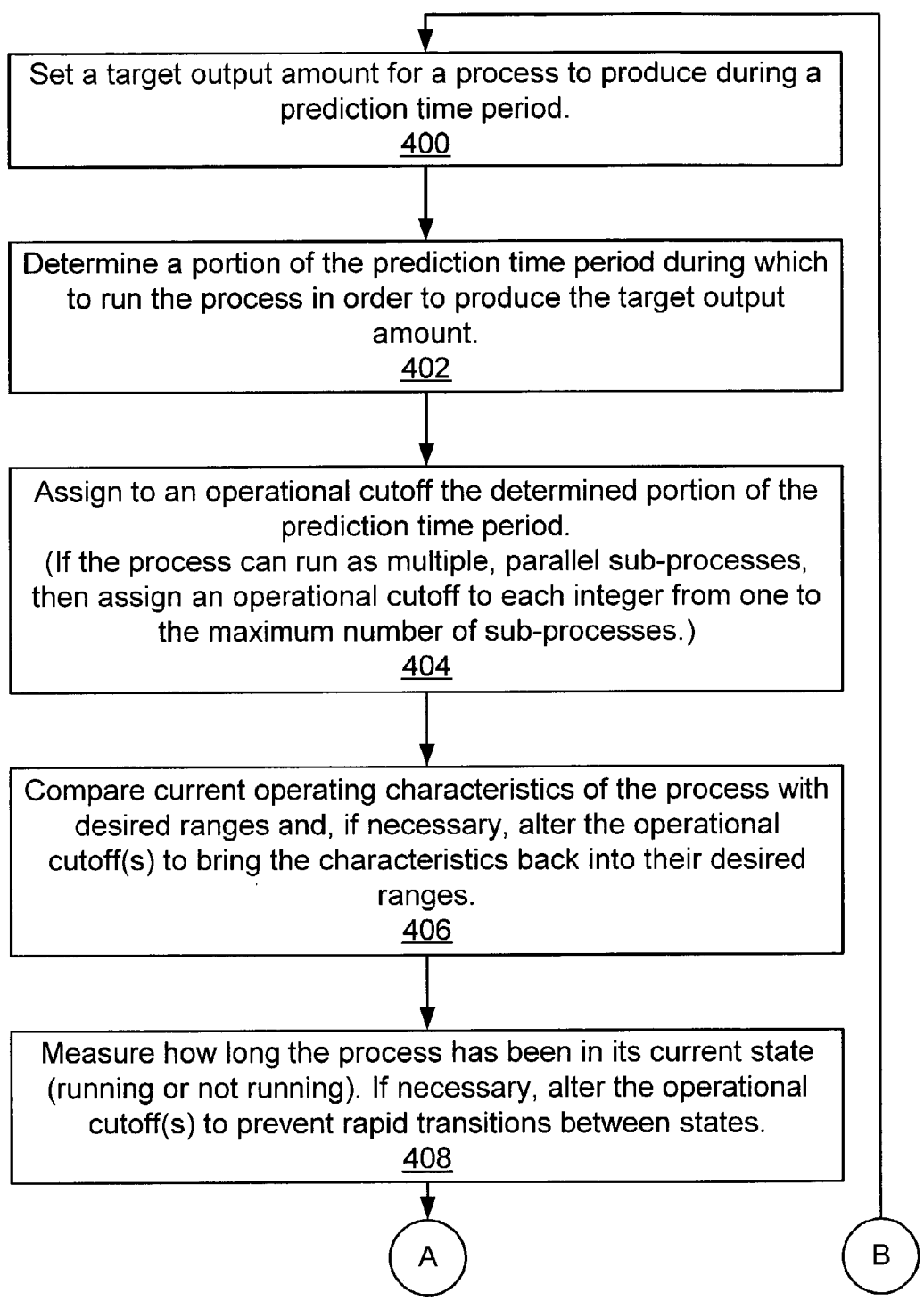

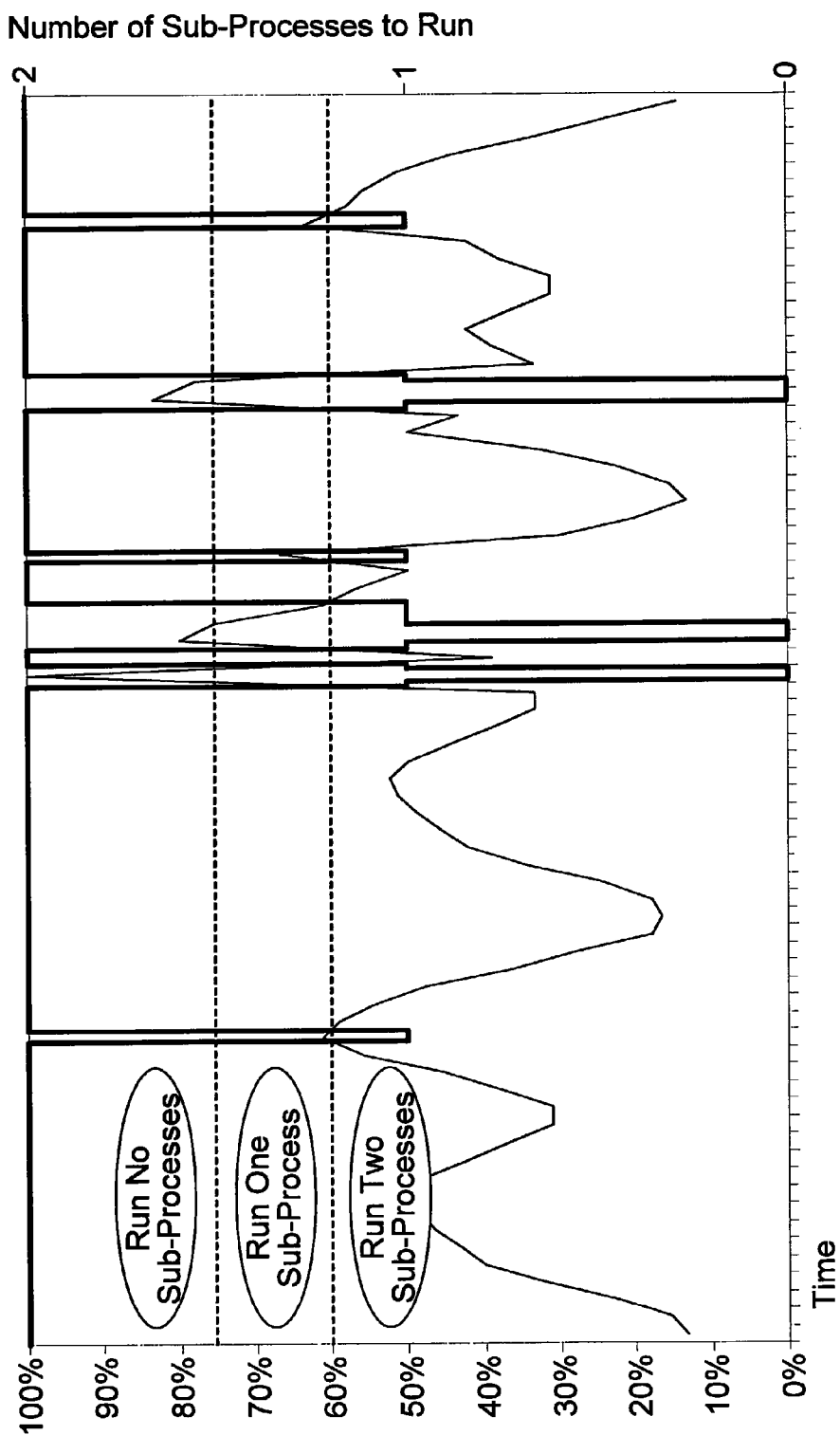

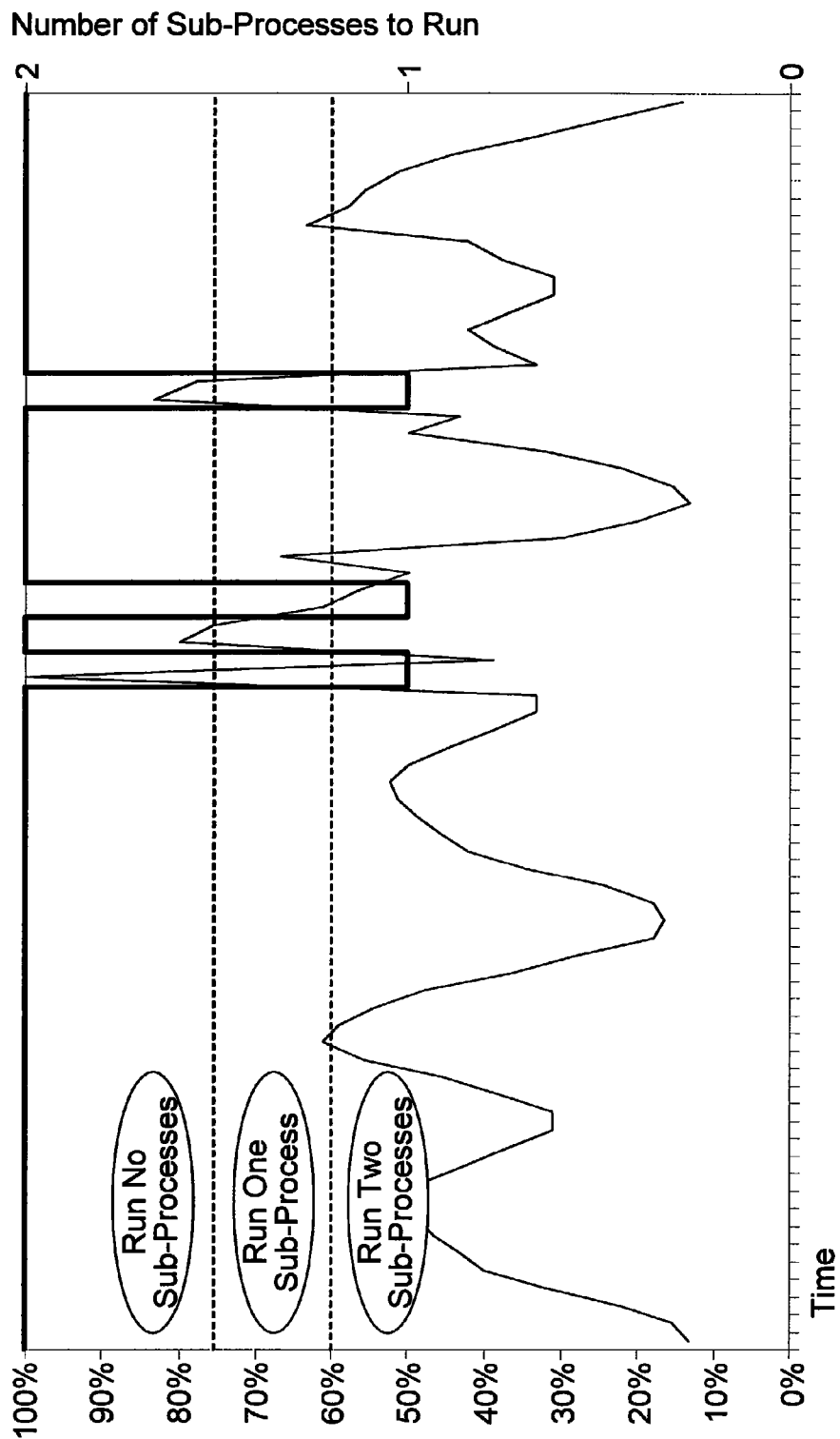

SCHEDULING A PROCESS ACCORDING TO TIME-VARYING INPUT PRICES

TECHNICAL FIELD

The present invention is related generally to process scheduling, and, more particularly, to scheduling when to run a process that uses an input whose price varies through time.

BACKGROUND OF THE INVENTION

The prices of many commodities, such as oil or electricity, vary through time. When the commodity is an input to a manufacturing process, the commodity's price may represent a large portion of the manufacturer's cost of running the process. Consequently, the time-varying price of the commodity may represent a large portion of the variability in manufacturing costs and thus a large portion of the variability in the manufacturer's profits.

Both to hold down total manufacturing costs and to decrease variability in those costs, manufacturers attempt to purchase price-varying commodities when their price is low. In some cases, a manufacturer buys a large quantity of the commodity at a low price and stockpiles it for later use. In other cases, the manufacturer has less flexibility because some commodities, such as electricity, are not readily stockpiled. In these cases, the manufacturer must purchase the commodity, whatever its current price, at the time the commodity is used as an input to the manufacturing process. Where stockpiling is not an option, the manufacturer may still decrease costs and variability by scheduling the process to run only when the price of the commodity is expected to be low. Of course, this is only possible if the manufacturer has some extra manufacturing capacity and thus need not run the process all the time.

Manufacturers use various known methods for predicting when the price of a time-varying commodity will be low. For some commodities, price variations are tied to predictable variations in supply and demand as when, for example, home heating oil prices rise during the winter in colder climates. For other commodities, or at timescales finer than the four seasons of the year, prices can change wildly and less predictably. This latter situation characterizes, for example, the short-term, hour by hour, market for electricity bought by large industrial users. Experience with existing methods has shown that making accurate predictions of the short-term price of electricity over the next few days is extraordinarily difficult. This is due in part to the short time frame of the prediction: too much can happen too quickly to allow long term, seasonal effects to smooth out short term variations. However, manufacturers are tied to such a short time frame if the process uses commodities that are not readily stockpiled. The manufacturer may be able to postpone running the process for an hour or even for a day, but rare is the manufacturer that can postpone a process in anticipation of lower energy prices three months from now.

Another factor leading to inaccuracies in price prediction is the large number of variables that can affect the short term price of a commodity. Many of these variables are unknowable to the predictor. Again using electricity as an example, another manufacturer may unexpectedly encounter difficulties and shut down a power-intensive manufacturing line. That shutdown lowers the demand for electricity which may very quickly result in a lower price as the electric power provider attempts to even out demand by varying the price. As another example, a power supply station may go offline, decreasing supply and increasing price.

What is needed is a way to schedule when to run a process to take advantage of time-varying input prices while avoiding the inaccuracies associated with predicting future prices of the input.

SUMMARY OF THE INVENTION

In view of the foregoing, the present invention schedules when to run a process to take advantage of time-varying input prices by predicting the "rank" of the current actual input price among future input prices. The rank is that portion of a future time period during which the input price will be less than the current actual input price. Rank may be predicted without predicting future prices of the input.

The predicted ranking of the actual input price is combined with operational considerations to make recommendations as to when to run a process. A target output amount is set for the process, and the portion of time during which the process should run in order to produce the target output amount is determined. An "operational cutoff" is set based on that portion. Periodically, say once an hour, the actual input price is determined, and its rank is predicted over a future time period. The future time period is usually short, typically on the order of a few hours to a couple of days. The predicted rank is then compared with the operational cutoff. If the predicted rank is below the cutoff, then it makes economic sense to run the process. Otherwise, it would be cheaper not to run the process at present but to wait a while in expectation that the input price will drop.

The operational cutoff can be altered to take advantage of changing economic circumstances. For example, a low input price threshold is set. If the actual input price drops below this threshold, then the operational cutoff is raised to cause the process to run, even though running the process produces more than the target output amount. In this way, output from the process is stockpiled to take advantage of the low input price.

Considerations other than economic ones influence when the process should run. If the process is part of a larger process, then inventory goals for other inputs to the process and for outputs from the process can be set. The operational cutoff is altered so that the process runs to meet the inventory goals.

Another consideration in the scheduling of a process is the amount of disruption associated with starting up or shutting down the process. To prevent the process from starting and stopping too often, a transition-smoothing threshold can be set so that a process remains in one state, either running or stopped, for at least as long as the threshold.

Sometimes a parent process is made up of multiple, parallel sub-processes. The sum of the outputs of the sub-processes is the output of the parent process. Multiple operational cutoffs are set to determine how many sub-processes are run at any one time. The cutoffs reflect characteristics of the process environment, such as, for example, the desire to keep at least one sub-process running at all times or the need to remove a sub-process from service for maintenance reasons.

A user interface allows a process operator to monitor the parameters that go into scheduling the process. The operator can fine-tune some of these parameters to reflect situations not automatically accounted for by the process scheduler.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 4a and 4b together form a flowchart showing how to derive operational cutoffs for a process from a predicted rank of the actual price of an input to the process;

FIG. 5b is a chart showing how a process responds to the operational cutoffs of FIG. 5a;

FIG. 5c shows how the process of FIG. 5b responds after smoothing out abrupt fluctuations in the input price;

DETAILED DESCRIPTION OF INVENTION

Figure 1:
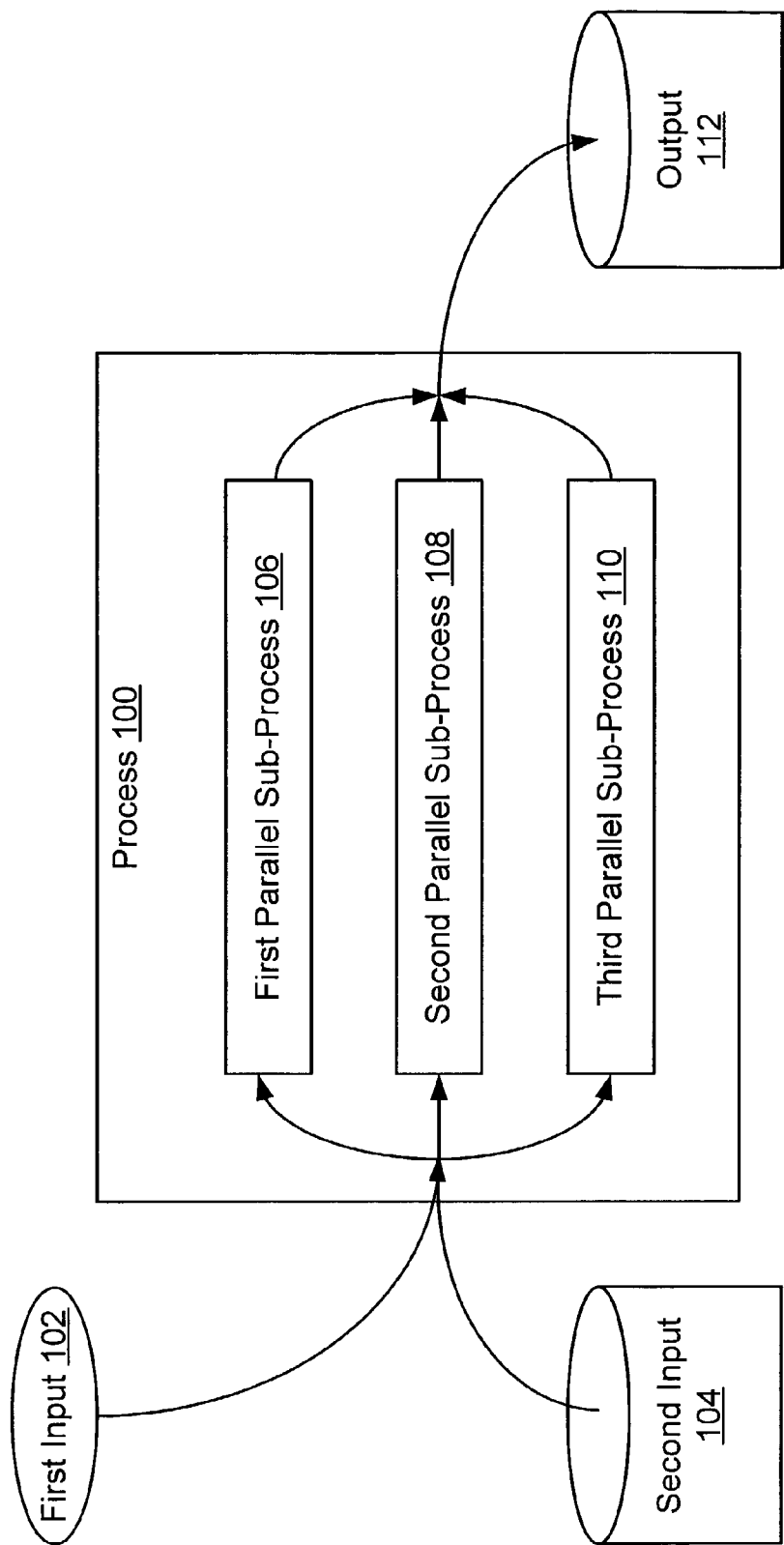
FIG. 1 is a schematic diagram showing a process with at least one input whose price varies with time.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In FIG. 1, a process 100 is running in a generalized process environment. A first input 102 to the process 100 has a price that varies with time. This first input 102 is not easily stockpiled. The present invention decreases the amount of money paid for the first input 102 by scheduling the process 100 to run at times when the time-varying price of the input 102 is low relative to other times. In the generalized schematic of FIG. 1, the process 100 also takes a second input 104 whose price is assumed not to vary significantly with time. The second input 104 may be stockpiled, as illustrated by its storage tank icon.

The process 100 is shown as being made up of three parallel sub-processes 106, 108, and 110. Each sub-process may represent, for example, one instance of a manufacturing line. The sub-processes take the inputs 102 and 104 and collectively produce the output 112 of the process 100.

The environment of FIG. 1 is intended solely to illustrate the following discussion and is not meant to imply any restrictions on the methods or applicability of the present invention. For example, in a real-world environment, the process 100 may take several inputs whose prices vary with time, the prices varying independently of one another. The methods of the present invention are applicable to these more complicated scenarios, as is discussed below.

Figure 2:
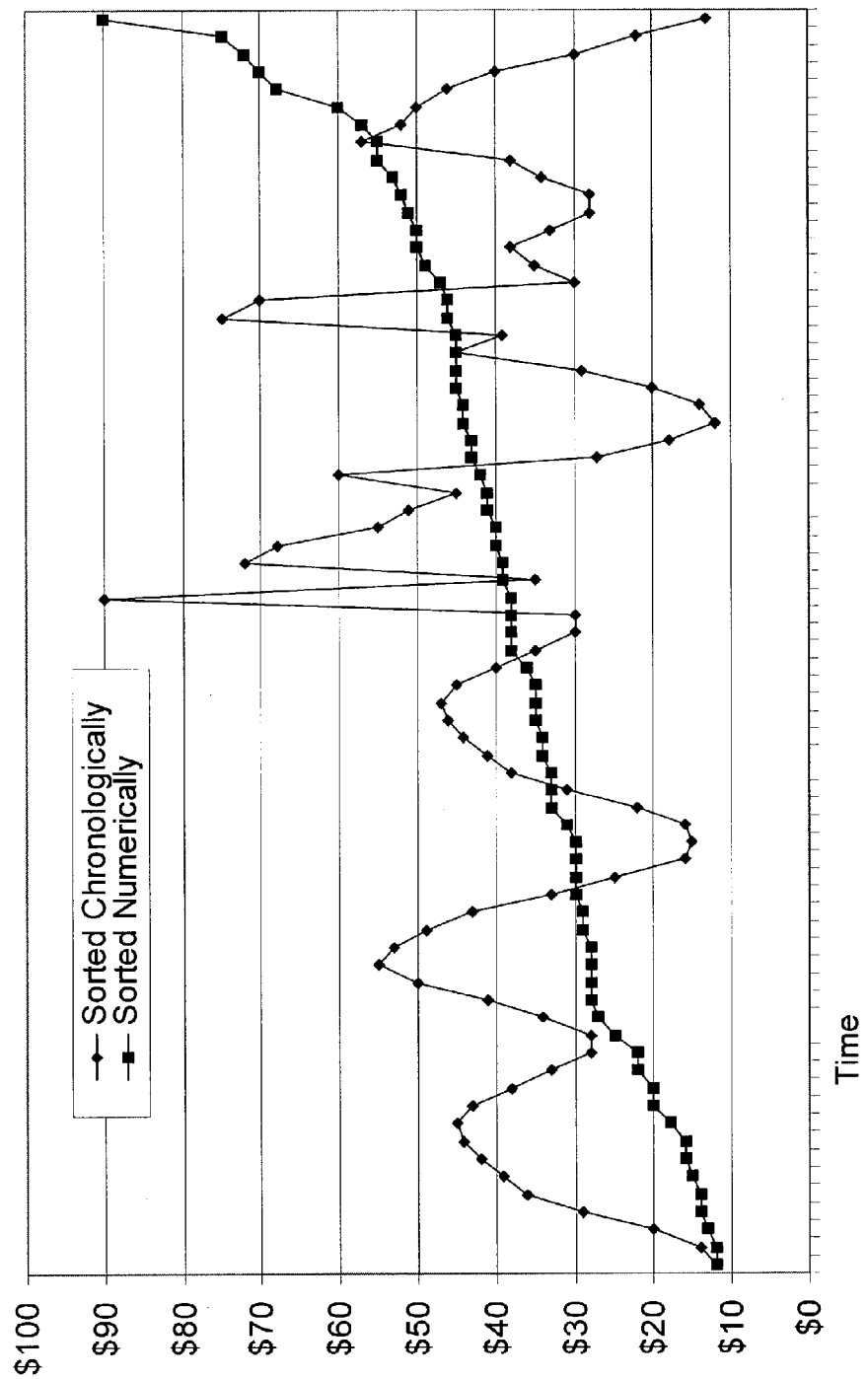
FIG. 2 is a chart showing a price of an input varying with time.

In FIG. 2, the line labeled "Sorted Chronologically" graphs the price of the input 102 through time as it varies from a low near $12 to a high of $90. (Of course, these input prices make sense only in reference to an amount of the input 102 that they purchase, for example, $12 per megawatt-hour (MWH) of electricity. In the discussion that follows, the amount of the input 102 that the price purchases is usually left out in order to emphasize the generality of the methods of the present invention.) FIG. 2 realistically characterizes the short-term, hour by hour, market for electricity bought by large industrial users. An electrical-power supply process, like many other manufacturing processes, runs most efficiently when it runs at a steady rate. Electrical power suppliers vary electricity costs for manufacturing users, increasing price when demand is high, decreasing the price again when demand slackens, in order to encourage manufacturers to even out usage. If the input 102 is electricity, then FIG. 2 shows, for a 72-hour period, the hour-by-hour price paid by a manufacturer for each MWH of electricity consumed. The wide range in the price of the input 102 rewards a manufacturer that schedules the process 100 to run when the input price is low.

Figure 3:
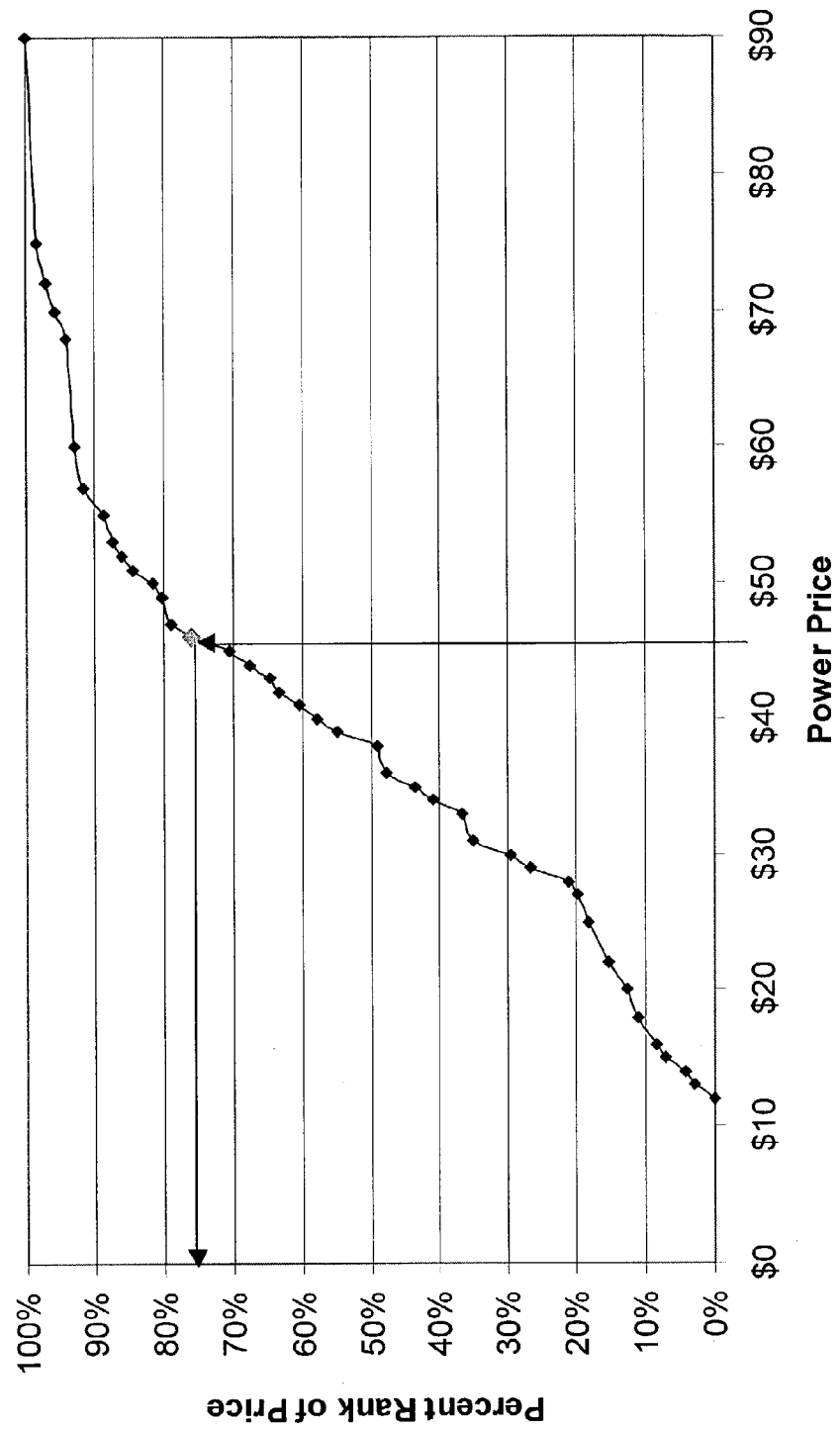
FIG. 3 is a chart of the percent rank of the time-varying input price of FIG. 2.

The line labeled "Sorted Numerically" in FIG. 2 uses the same data points as does the line "Sorted Chronologically" but places them in ascending order by input price. A quick glance at this line shows that the input price is between $28 and $48 about two-thirds of the time. FIG. 3 is a more rigorous version of this quick glance. Again using the same data points as in both lines of FIG. 2, FIG. 3 plots the "percent rank" of each input price point. For a selected price point, the percent rank of that point is the percentage of the time period graphed in FIG. 2 in which the input price is less than the input price of the selected price point. For example, the percent rank of the $46 price point is about 76%, meaning that during 76% of the time period graphed in FIG. 2, the input price is below $46.

According to one aspect of the present invention, the predicted percent (or fractional) rank of the price of the input 102 drives the scheduling of the process 100. For a quick example based on the data in FIG. 3, if the process 100 should run 76% of the time in order to achieve a target output amount, then ideally the process 100 is scheduled to run whenever the input price is below $46. That scheduling would produce exactly the target output amount at the lowest possible cost of the input 102.

Figure 4B:
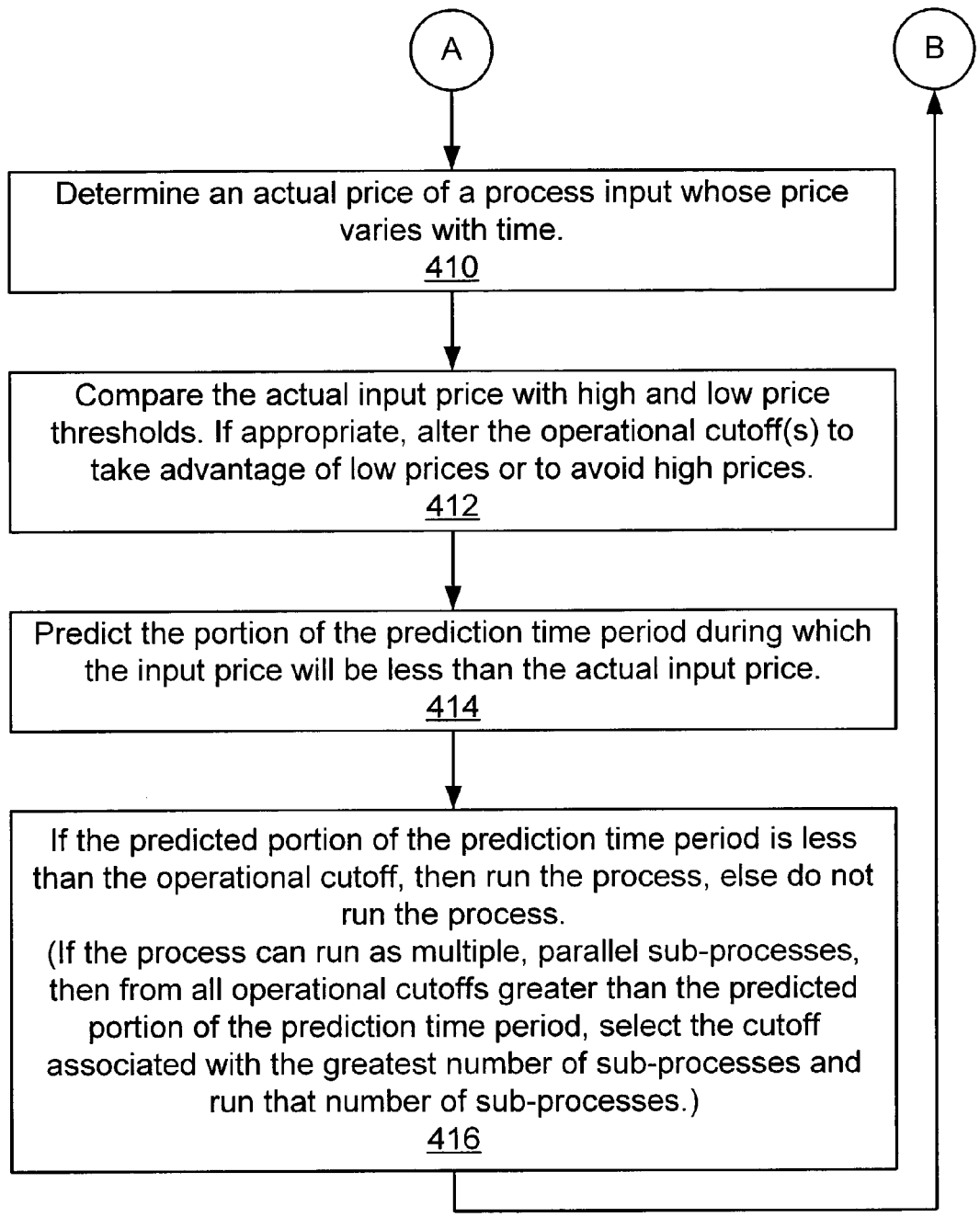

FIGS. 4a and 4b together form a flowchart showing an exemplary method for scheduling the process 100 to run in the face of uncertain future prices of the input 102 and in the face of other considerations that may override the desire to pay the least possible amount for the input 102. The method begins in step 400 by setting a target output amount for the process 100 to produce in a prediction time period. That time period represents the "prediction horizon" for the method. The prediction time period begins at the present. The length of the prediction time period is determined by specifics of the environment of the process 100. Ideally, the prediction time period is chosen to be long enough to incorporate meaningful variations in the price of the input 102. For example, if the price of the input 102 varies on the hour, then the prediction time period should be at least several hours long. The prediction time period should also be short enough that meaningful predictions can be made. Other considerations may affect the length of the prediction time period. If, for maintenance reasons, the process will shut down for two months beginning in 48 hours, then the prediction time period probably would not extend past 48 hours. Experience has shown that a 72-hour prediction time period normally provides good results when the input 102 is electricity.

In step 402, the output capacity of the process 100 is compared with the target output amount. If the capacity of the process 100, running continuously during the prediction time period, is greater than the target output amount, then the process 100 has some "overcapacity." This overcapacity means that the process 100 need only run during a portion of the prediction time period in order to produce the target output amount. For the sake of the present discussion, assume that step 402 determines that the process 100 should only run 76% of the time in order to meet the target.

In step 404, a preliminary operational cutoff is set at the portion of time during which the process 100 should run to meet the target. In the example, the preliminary operational cutoff is set at 76%.

In order to first explain the basic method of FIGS. 4a and 4b, some optional refinements to the method are ignored at this point in the discussion. Specifically, the parenthetical considerations of steps 404 and 416 and the entireties of steps 406, 408, and 412 are discussed below after the discussion of the basic method.

In step 410 of FIG. 4b, the actual price of the input 102 is determined, possibly by querying the supplier of this input. Step 414 takes that actual input price and predicts its fractional rank in the set of all input prices over the prediction time period set in step 400. One may think of the prediction process as trying to predict a graph like that of FIG. 3 covering the prediction time period. From the known actual input price, the predicted graph yields the fractional rank. This is only a conceptual model, however, and embodiments of the present invention may predict the rank of the actual input price without developing an equivalent of the graph of FIG. 3 as an intermediate result.

Steps 410 and 414 are expanded when the process 100 takes more than one input whose price varies with time. The actual input price in step 410 becomes a sum of the actual prices of the inputs, weighted by the amount of each input needed by the process 100. Similarly, the rank predicted in step 414 is based on the portion of the prediction time period during which the weighted sum of the input prices is predicted to be less than the weighted sum of the actual input prices. Step 414 becomes more complicated with multiple inputs because the predicted prices of the inputs may change independently of one another, one predicted price increasing while another decreases or remains constant. The general scheduling method, however, remains the same.

Various statistical techniques may be used, singly or in combination, in step 414 to predict the fractional rank of the actual input price. As a first approximation, the input prices over the prediction time period may be predicted to match exactly the prices over a just-completed time period of equal length. In the example used so far, the rank of the actual input price is taken over the set of actual input prices recorded for the past 72 hours. As a first refinement to this method, if the input price historically follows a cycle whose period does not match the prediction time period, then the actual input price is compared to input prices over the past cycle period. For example, electricity prices tend to follow a weekly cycle, so the actual input price is ranked over a 72-hour period beginning one week ago. As a second refinement, the actual input price may be compared to the input price one cycle ago. If the actual input price has increased, then an increase of a similar proportion may be predicted for all input prices during the prediction time period. The method may be further refined by considering the rate of change of the input price over the past cycle rather than simply the magnitude of the change. Other considerations can be added to the prediction process. In some situations, variations in future demand are predicted, and the predicted rank reflects the predicted demand variation. The statistical methods chosen for a specific embodiment of the present invention depend upon experience with what provides good results for a given process environment, the data available as inputs to the prediction, and the sophistication of the predictive model.

Once the rank of the actual input price is predicted, the predicted rank is compared to the operational cutoff in step 416. If the predicted rank is below the cutoff, then it makes economic sense to run the process. In the example, the process 100 should run 76% of the prediction time period in order to produce the target output amount. The method of FIGS. 4a and 4b schedules the process 100 to run during the 76% of the prediction time period when the price of the input 102 is lower than at other times. During the other 24% of the prediction time period, the process 100 is not scheduled to run as it would be cheaper to wait a while in expectation that the input price will drop.

After step 416, the method of FIGS. 4a and 4b loops back to step 400. Although the rank of the actual input price was predicted for the entire prediction time period in step 414, that prediction may be modified repeatedly over the course of the prediction time period. This allows the values of the actual input price, as they become known, to be fed as inputs to the prediction, thus improving its accuracy. This repetition also allows the target output amount to be repeatedly updated to take into account the actual output of the process 100 during the previous loop. The prediction time period is often a sliding window: once an hour, for example, the rank of the actual input price is predicted for the next 72 hours. In some implementations, the loop of FIGS. 4a and 4b is repeated at regular intervals. Other implementations wait at the end of step 416 for new information that could alter the prediction before returning to step 400.

Figure 5A:
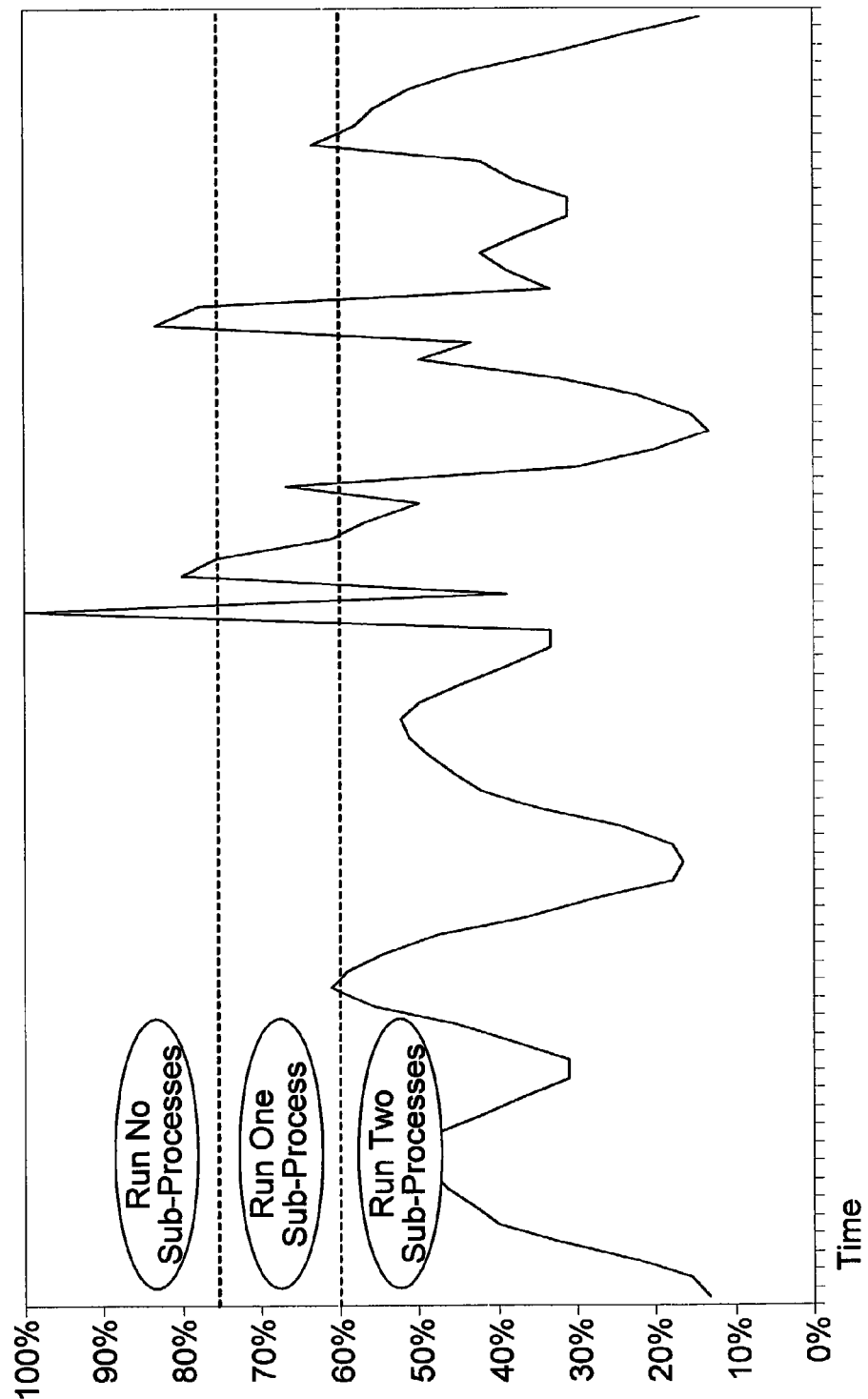
FIG. 5a is a chart showing operational cutoffs for running zero, one, or two sub-processes of an exemplary process.

The scenario just described is the most basic one. Usually, other characteristics of the process environment are taken into account before scheduling when to run the process 100. Returning to step 404, the parenthetical considers a situation like the one illustrated in FIG. 1. The process 100 consists of a number of parallel sub-processes. Deciding whether or not to run the process 100 becomes deciding how many sub-processes, from zero to the maximum possible number, to run. In step 404, a separate operational cutoff can be set for each of these numbers. Then in step 416, the predicted rank of the actual input price is compared with the set of operational cutoffs. As an example, consider FIG. 5a. The predicted rank of the input price is graphed through time (thin, solid line). The process 100 consists of two parallel sub-processes, so FIG. 5a shows two operational cutoffs (dashed lines). A first operational cutoff is set at 76%: when the predicted rank is above that amount, no sub-processes are run. When the predicted rank is below 76%, at least one sub-process is scheduled to run. When the predicted rank drops below the second operational cutoff, shown at 60%, the second sub-process also runs. FIG. 5b shows the result. The thick, solid line of FIG. 5b shows whether zero, one, or two sub-processes are scheduled to run. (The vertical axis on the right side of FIG. 5b is for the number of sub-processes to run.)

If savings on the amount paid for the input 102 were the only consideration, then the multiple operational cutoffs of FIGS. 5a and 5b would coincide. The difference between them is due to other considerations from the process environment, such as the desire to have one subprocess operational at all times.

In step 406, other characteristics of the process environment are considered, and the operational cutoffs are modified to bring those characteristics back into their desired ranges. The set of characteristics under consideration in step 406 varies from implementation to implementation. Using the environment of FIG. 1 as an example, it may be important to prevent the storage tank holding the output 112 of the process 100 from either overflowing or running empty (when feeding another process, not shown). Desired maximum and minimum volume levels are set for that storage tank. During operation, the volume in the storage tank is measured, and the operational cutoffs are modified to keep the volume within the desired range. In some process environments, the desired volume levels change depending upon the time of day and day of week. Even rather complicated environmental characteristics may be accommodated by altering the operational cutoffs.

In some environments, it would be too disruptive to start and stop a process exactly in accordance with the varying price of the input 102. Again consider FIG. 5b where the number of sub-processes running often changes hour-by-hour. In step 408 of FIG. 4a, a transition-smoothing threshold is considered. The schedule is altered (possibly by altering the operational cutoffs as mentioned in the text of step 408 or possibly by overriding the recommendation of the cutoffs) so that any one sub-process remains in a state, running or not running, for at least as long as the transition-smoothing threshold. Applying a transition-smoothing threshold of a couple of hours to the schedule of FIG. 5b results in the less frenetic schedule of FIG. 5c. The schedule of FIG. 5c is also smoother because the price of the input 102 is only sampled once an hour.

As one more example of a consideration altering the schedule, consider step 412 of FIG. 4b. If the actual input price is quite low, it might make sense to take advantage of the low price by running the process 100 even if that means the target output amount will be exceeded. In the example of FIG. 1, this is possible if the storage tank holding the output 112 has room for the additional output. When the loop of FIGS. 4a and 4b returns to step 400, a new target output amount can be set that takes into consideration this additional output already produced.

Figure 6A:
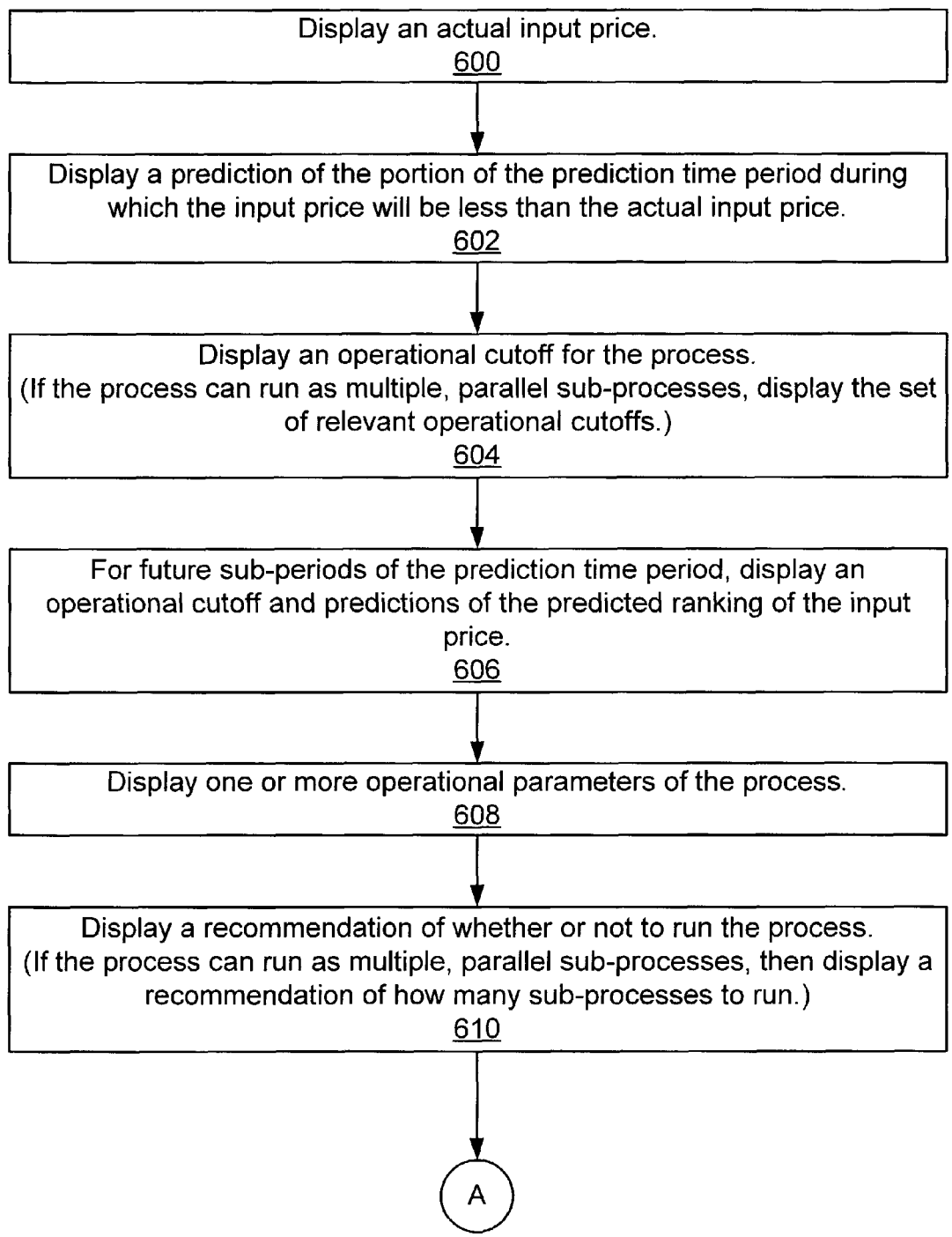
FIGS. 6a and 6b together form a flowchart of an exemplary user interface for adjusting operational cutoffs.
Figure 6B:
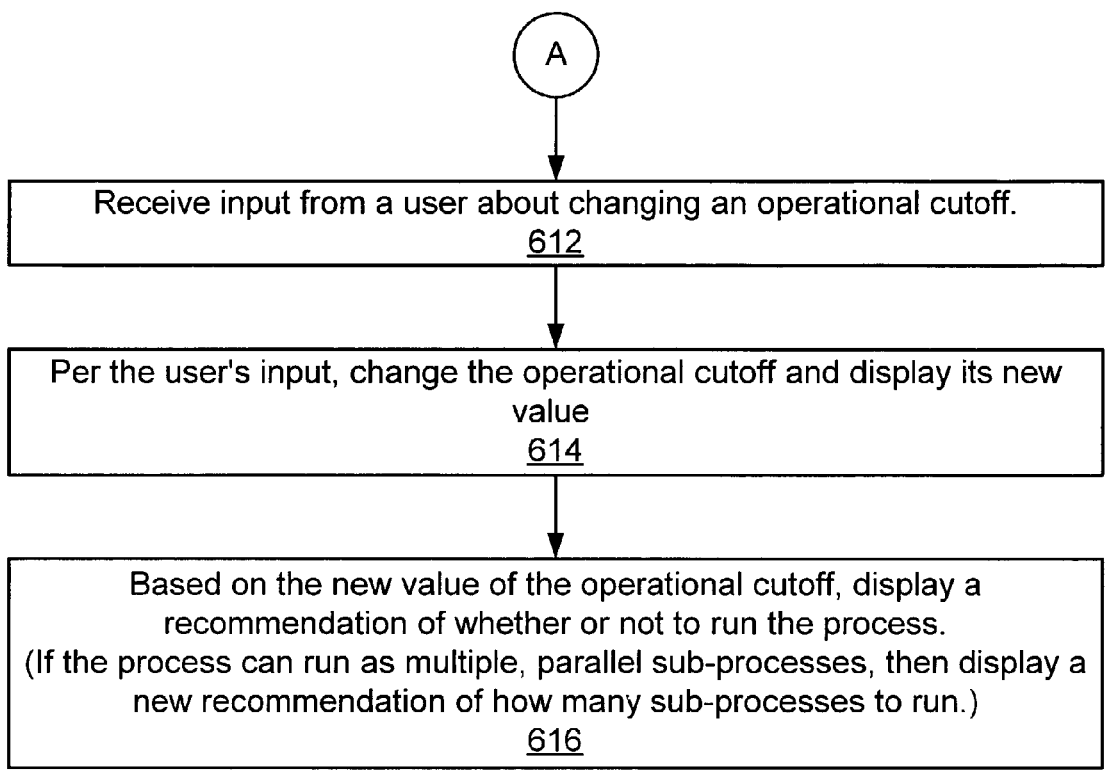
Figure 7:
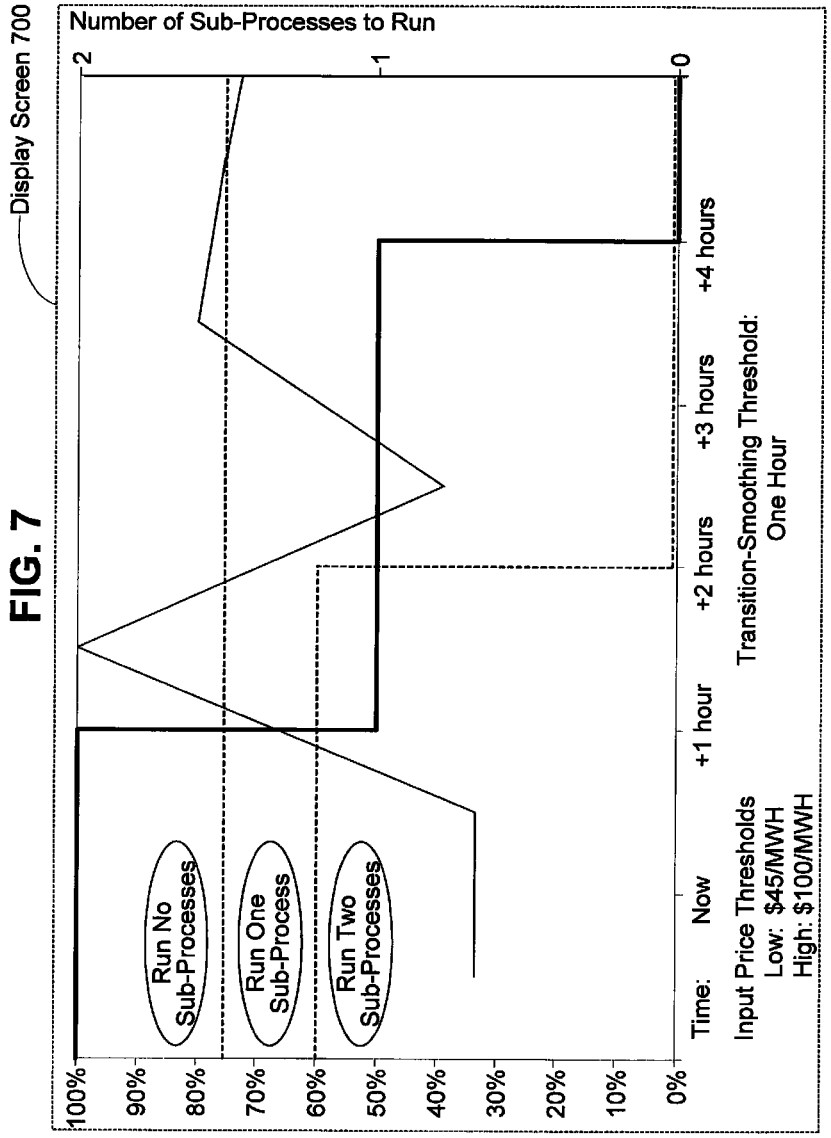
FIG. 7 is a screen display of an exemplary user interface for adjusting operational cutoffs.

An operator can monitor the schedule and the considerations that go into making the schedule. FIGS. 6a and 6b together present a flowchart of an exemplary user interface, and FIG. 7 show an exemplary screen display 700 usable with the method of FIGS. 6a and 6b. Step 600 optionally shows the actual input price. Step 602 shows the predicted rank of that input price over the prediction time period. One or more operational cutoffs are displayed in step 604. In step 606, the predicted rank and the operational cutoffs are shown for a short period into the future. This period is usually a small portion of the prediction time period. In the example of FIG. 7, the predicted rank (thin, solid line) and two operational cutoffs (dashed lines) are shown for the next four hours.

Step 608 displays one or more operational parameters that go into the calculation of when to schedule the process 100 to run. The operational parameters shown in FIG. 7 are low and high input price thresholds (considered in step 412 of FIG. 4b) and a transition-smoothing threshold (considered in step 408 of FIG. 4a).

The last piece of information displayed, in step 610, by the exemplary method of FIGS. 6a and 6b is the recommendation as to whether or not to run the process (or how many sub-processes to run). The thick, solid line in FIG. 7 shows the recommendation for the next four hours.

The operator monitors the screen display 700 and may choose to take action to alter the recommendations of the schedule. In steps 612 and 614, the user's input is taken, and new operational cutoffs are calculated and displayed to reflect that input. The recommended schedule is recalculated in step 616 to reflect the changed operational cutoffs.

The user of the display 700 has taken direct action to set the lower of the two operational cutoffs to zero beginning two hours from how. This reflects a maintenance schedule that removes one of the sub-processes from service at that time. Beginning two hours from now, the altered operational cutoff prevents more than one sub-process from being scheduled to run even when the price drops so low between two and three hours from now.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that the length of the prediction time period and the set of characteristics that go into predicting the rank of the actual input price are determined by the needs of an embodiment optimized for a specific process environment. Therefore, the invention as described herein contemplates all such embodiments as may come within the scope of the following claims and equivalents thereof.

We claim:

1. A method carried out by a computer system including a physical computer-readable medium including computer-executable instructions for deciding whether to run a process to take advantage of time varying input commodity prices in order to reduce expenditures based on an actual price of an input commodity to the process while achieving an actual output amount at least as great as a target output amount, the actual output amount based, at least in part, on an amount of time that the process runs, the computer-executable instructions comprising:

determining a prediction time period for the process to run based on the target output amount;

determining a first portion of the prediction time period during which the input commodity is available for the process to run in order to achieve the target output amount;

determining a plurality of input commodity prices available for the process to run during the first portion of the prediction time period;

calculating a fractional rank for each of the input prices during the first portion of the prediction time period;

selecting an actual price of the input commodity based on a selected fractional rank if the process is run in a present time frame;

predicting a second portion of the prediction time period during which the price for the input commodity will be less than the selected actual price of the input commodity in the present time frame;

comparing the predicted second portion of the prediction time period with the determined first portion of the prediction time period; and deciding to run the process in response to the predicted second portion of the prediction time period being less than the determined first portion of the prediction time period.

2. The method carried out by the computer system of claim 1 wherein predicting the second portion of the prediction time period comprises using a value selected from the group consisting of: the selected actual input commodity price, actual input commodity price in a prior period, rank of the selected actual input commodity price in a set of actual input commodity prices over a prior period, rank of the selected actual input commodity price in a set of actual input commodity prices in a day of the week, change in the actual price of the commodity input over a prior period, and predicted demand of the input commodity.

3. The method carried out by the computer system of claim 1 wherein predicting the second portion of the prediction time period comprises:

predicting prices of the input commodity during the prediction time period;

dividing the prediction time period into sub-periods, the dividing consistent with the predicted input commodity price being substantially constant during each sub-period; and assigning to the predicted second portion of the prediction time period during which the input commodity price will be less than the selected actual price of the input commodity having the selected fractional rank, a portion of the prediction time period represented by sub-periods with predicted input prices less than the selected actual price of the input commodity having the selected fractional rank.

4. The method carried out by the computer system of claim 3 wherein predicting prices of the input commodity comprises predicting absolute input commodity prices based on the fractional rank for each of the input commodity prices.

5. The method carried out by the computer system of claim 3 wherein predicting prices of the input commodity comprises predicting relative input commodity prices based on the fractional rank for each of the input commodity prices.

6. The method carried out by the computer system of claim 3 wherein dividing the prediction time period comprises dividing the prediction time period into equal-length sub-periods.

7. The method carried out by the computer system of claim 3 wherein dividing the prediction time period comprises dividing the prediction time period into contiguous sub-periods of maximal length consistent with the predicted input commodity price being substantially constant during each sub-period.

8. The method carried out by the computer system of claim 3 wherein dividing the prediction time period comprises assigning one predicted input commodity price to each sub-period.

9. The method carried out by the computer system of claim 3 wherein dividing the prediction time period comprises setting a price differential threshold and wherein the predicted input price is constant within a range defined by the price differential threshold for each sub-period.

10. The method carried out by the computer system of claim 3 wherein the input comprises a plurality of sub-inputs;
    wherein predicting prices of the input commodity comprises predicting prices of a plurality of sub-inputs;
    wherein dividing the prediction time period into sub-periods is consistent with a sum of the predicted sub-input prices being substantially constant during each sub-period and each price below the selected fractional rank; and
    wherein assigning to the predicted second portion comprises assigning to the predicted second portion of the prediction time period during which the input commodity price will be less than the selected actual input commodity price, a portion of the prediction time period represented by sub-periods with sums of the predicted sub-input prices less than the selected actual input commodity price based on the selected fractional rank.

11. The method carried out by the computer system of claim 1 further comprising the computer-executed steps of:
    determining a new first portion of a new prediction time period during which the process should run in order to achieve the target output amount;
    determining a plurality of new input commodity prices available for the process to run during the new determined first portion of the new prediction time period;
    calculating a new fractional rank for each of the new input commodity prices during the new determined first portion of the new prediction time period;
    selecting a new actual price of the input commodity based on a selected new fractional rank if the process is run in a new present time frame;
    predicting a new second portion of the new prediction time period during which the input commodity price will be less than the new actual price of the input commodity in the new present time frame;
    comparing the new predicted second portion of the new prediction time period with the new determined first portion of the new prediction time period; and
    if the new predicted second portion of the new prediction time period is less than the new determined first portion of the new prediction time period, then deciding to run the process in the present time frame.

12. The method carried out by the computer system of claim 11 further comprising the computer-executed steps of:
    assigning to the target output amount a new value, the new value based, at least in part, on an amount of output already produced.

13. A non-transitory physical computer-readable medium containing instructions for performing a method for deciding whether to run a process in order to reduce expenditures on an input to the process while achieving an actual output amount at least as great as target output amount, a price of the input varying through time, the actual output amount based, at least in part, on an amount of time that the process runs, the method comprising:
    determining a prediction time period for the process to run based on the target output amount to be produced;
    determining a first portion of the prediction time period during which the process should run in order to achieve the target output amount;
    calculating a fractional rank for each of the input prices during the first portion;
    determining an actual price of the input based on a selected fractional rank if the process is run in a present time frame;
    predicting a second portion of the prediction time period during which the input price will be less than the determined actual price of the input in the present time frame;
    comparing the predicted second portion of the prediction time period is less than the determined first portion of the prediction time period, then deciding to run the process in the present time frame.

14. The physical computer-readable medium of claim 13 wherein predicting comprises using a value selected from the group consisting of: the selected actual input price, actual input price in a prior period, rank of the selected actual input price in a set of actual input prices over a prior period, rank of the selected actual input price in a set of actual input prices in a day of the week, change in the actual price of the input over a prior period, and predicted demand of the input.

15. The physical computer-readable medium of claim 13 wherein predicting comprises:
    predicting prices of the input during the prediction time period;
    dividing the prediction time period into sub-periods, the dividing consistent with the predicted input price being substantially constant during each sub-period; and
    assigning to the predicted second portion of the prediction time period during which the input price will be less than the determined actual price of the input based on the selected fractional rank, a portion of the prediction time period represented by sub-periods with predicted input prices less than the determined actual price of the input.

16. The physical computer-readable medium of claim 15 wherein predicting prices of the input comprises predicting absolute input prices based on the fractional rank.

17. The physical computer-readable medium of claim 15 wherein predicting prices of the input comprises predicting relative input prices based on the fractional rank.

18. The physical computer-readable medium of claim 15 wherein dividing the prediction time period comprises dividing the prediction time period into equal-length sub-periods.

19. The physical computer-readable medium of claim 15 wherein dividing the prediction time period comprises dividing the prediction time period into contiguous sub-periods of maximal length consistent with the predicted input price being substantially constant during each sub-period.

20. The physical computer-readable medium of claim 15 wherein dividing the prediction time period comprises assigning one predicted input price to each sub-period.

21. The physical computer-readable medium of claim 15 wherein dividing the prediction time period comprises setting a price differential threshold and wherein the predicted input price is constant within a range defined by the price differential threshold for each sub-period.

22. The physical computer-readable medium of claim 15 wherein the input comprises a plurality of sub-inputs;
wherein predicting prices of the input comprises predicting prices of a plurality of sub-inputs;
wherein dividing the prediction time period into sub-periods is consistent with a sum of the predicted sub-input having a price below the selected fractional rank and the predicted sub-input prices being substantially constant during each sub-period; and
wherein assigning to the predicted second portion comprises assigning to the predicted second portion of the prediction time period during which the input price will be less than the determined actual input price, a portion of the prediction time period represented by sub-periods with sums of the predicted sub-input prices less than the determined actual input price based on the selected fractional rank.

23. The physical computer-readable medium of claim 13 further comprising:
determining a new first portion of a new prediction time period during which the process should run in order to achieve the target output amount;
determining a plurality of new input prices available for the process to run during the new prediction time period;
calculating a new fractional rank for each of the new input prices during the new first portion;
selecting a new actual price of the input based on a selected new fractional rank if the process is run in a new present time frame;
predicting a new second portion of the new prediction time period during which the input price will be less than the new actual price of the input in the new present time frame;
comparing the new predicted second portion of the new prediction time period with the new determined first portion of the new prediction time period; and
if the new predicted second portion of the new prediction time period is less than the new determined first portion of the new prediction time period, then deciding to run the process in the present time frame.

24. The physical computer-readable medium of claim 23 further comprising:
assigning to the target output amount a new value, the new value based, at least in part, on an amount of output already produced.

25. A method carried out by a computer system including a physical computer-readable medium including computer-executable instructions for deciding to run a process in order to reduce expenditures on an input to the process while achieving an actual output amount at least as great as a target output amount, a price of the input varying through time, the actual output amount based, at least in part, on an amount of time that the process runs, the method comprising the computer-executed steps of:
determining a first amount of time within a prediction period during which the process should run in order to achieve the target output amount;
determining a plurality of input commodity prices available for the process to run during the first amount of time;
calculating a fractional rank for each of the input prices during the first amount of time;
selecting an actual price of the input based on a selected fractional rank if the process is run in a present time frame;
predicting a second amount of time of the prediction period during which the price of the input will be less than the selected actual price of the input in the present time frame;
comparing the predicted second amount of time within the prediction period with the determined first amount of time; and
if the predicted second amount of time within the prediction period is less than the determined first amount of time within the prediction period, then deciding to run the process in the present time frame.

26. A non-transitory physical computer-readable medium containing instructions for performing a method for deciding to run a process in order to reduce expenditures on an input to the process while achieving an actual output amount at least as great as a target output amount, a price of the input varying through time, the actual output amount based, at least in part, on an amount of time that the process runs, the method comprising:
determining a first amount of time within a prediction period during which the process should run in order to achieve the target output amount;
determining a plurality of input commodity prices available for the process to run during the first amount of time;
calculating a fractional rank for each of the input prices during the first amount of time;
selecting an actual price of the input based on a selected fractional rank if the process is run in the present time frame;
predicting a second amount of time of the prediction period during which the input price will be less than the selected actual price of the input in the present time frame;
comparing the predicted second amount of time within the prediction period with the determined first amount of time; and
if the predicted second amount of time within the prediction period is less than the determined first amount of time within the prediction period, then deciding to run the process in the present time frame.

* * * * *